Dec. 16, 1958  D. L. MUELLER ET AL  2,864,980
SEALED CURRENT RECTIFIER

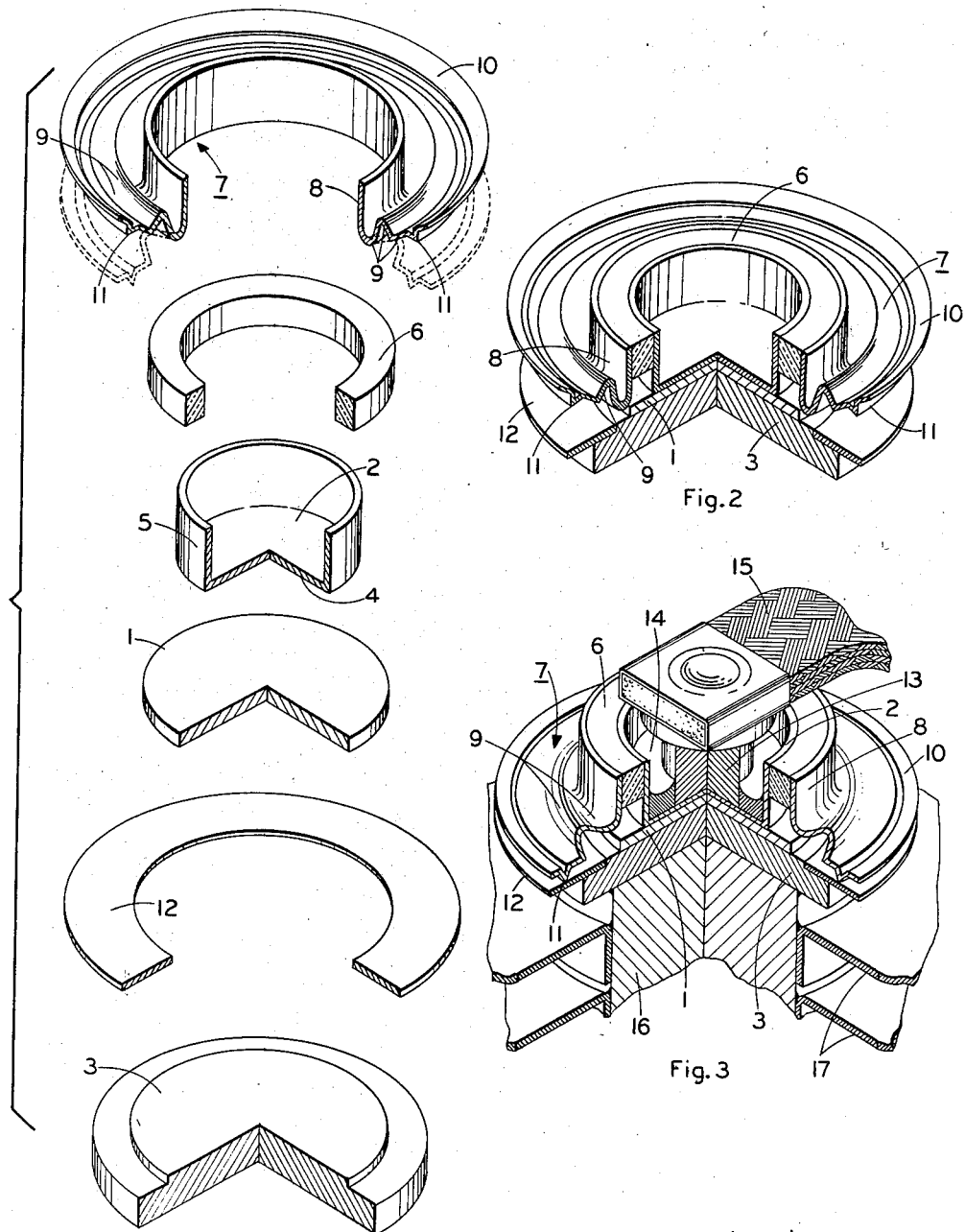

Filed June 10, 1957  2 Sheets-Sheet 2

Inventors:
David L. Mueller
William J. Martin, Jr.
by James E. Wrose
Their Attorney

United States Patent Office 2,864,980
Patented Dec. 16, 1958

2,864,980

SEALED CURRENT RECTIFIER

David L. Mueller, Medford, Mass., and William J. Martin, Jr., Bristol, N. H., assignors to General Electric Company, a corporation of New York Application June 10, 1957, Serial No. 664,670

7 Claims. (Cl. 317—234)

The present invention relates to sealed dry rectifiers and, more particularly, to improved semiconductor cell assemblies having unique protective enclosures.

Ambient environmental factors such as dust, moisture, fumes and the like are known to have seriously adverse effects upon certain rectifier cells, and appropriate protection has been sought through varnishing, painting, encapsulation, and enclosure. Cells including germanium and silicon semiconductor wafers are sensitive to environmental conditions of these types and, because of their large current capacity to size ratios, further demand structure which will dissipate thermal losses at high rates avoiding overheating and consequent cell deterioration. Critical temperatures for such semiconductors must also be avoided during cell fabrication operations.

Perhaps the most complete protection and satisfactory thermal characteristics are realized with impervious enclosures surrounding the wafers. These may be formed of a number of component parts certain of which are first joined separately at temperatures which might otherwise be destructive to the cell and which are thereafter brought together for a final juncture completing the hermetic seal under conditions which prevent injury to the cell. Rectifier cell units of sealed construction are described in the disclosures of U. S. Patents Nos. 2,751,528 and 2,756,374, both assigned to the same assignee as that of the present application.

In one assembly of a broad-area rectifier unit, a semiconductor wafer has opposite faces thereof bonded to conducting members through special solders, one of such solders providing a desired alloying which develops an electrical rectifying junction. Edges of the wafer, as well as peripheral portions of the aforesaid faces, may remain unsoldered, such that the two opposite faces are not shorted and such that currents sought to be rectified will not by-pass the rectifying junction. Small amounts of the solders, and contaminants and impurities of other types encountered in industrial processing, may tend to collect upon and seriously disturb these surfaces between the conducting members such that short-circuiting, leakage, and creepage can occur. In attempted avoidance of these difficulties, the exposed surfaces of the wafers are cleaned of contamination before the final sealing steps are taken. A chemical or electrochemical etch may be employed for this cleaning operation, for example, followed by drying and hermetic enclosure. However, the likelihood of re-contamination is heightened by undue exposure of the critical surfaces before sealing, and prospects of thermal injury to the cell junctions are increased where the final sealing steps to complete the enclosure after etching must be performed in the vicinity of the wafer junctions.

Accordingly, it is one of the objects of the present invention to provide improved constructions of sealed current rectifiers which facilitate hermetic sealing and aid in avoiding cell injuries during fabrication.

A further object is to provide improved strain-free rectifier cell enclosures which are uniquely adjustable to afford access for cell decontamination.

By way of a summary account of our invention in one of its aspects, a thin germanium semiconductor wafer is sandwiched between and soldered on opposite faces to two flat-surfaced conductive electrode structures. An annular ceramic member is bonded and sealed with one of the electrode structures as an integral part thereof and an annular conductive member is in turn bonded and sealed with the ceramic member. The aforesaid annular conductive member is provided with at least one annular corrugation intermediate its inner and outer peripheries, and the material and design thereof are such that the outer peripheral or rim portion may be readily moved or snapped between two discrete position. In one of these positions, this outer peripheral portion rests upon a surface of the opposite electrode structure, such that it may be readily soldered or welded thereto, and in the other of these positions, this outer rim portion is separated from the opposite electrode structure to expose the entire periphery of the semiconductor wafer. Prior to making the final hermetic seal between the outer rim portion and the cooperating electrode surface, the corrugated member may be snapped to the separated position such that the semiconductor wafer edges are accessible for etching and drying. Immediately thereafter, the unit may be snapped to closure by movement of the rim portion of the corrugated member into engagement with the cooperating electrode surface, and a circular projection weld seals them together and completes the hermetic enclosure.

The subject matter regarded as our invention is particularly pointed out and distinctly claimed in the concluding portion of this specification. However, both as to preferred structure and assembly, and further in relation to objects and advantages thereof, this invention may best be understood through reference to the following description taken in connection with the accompanying drawings, wherein:

Figure 1 provides an exploded pictorial view of one rectifier cell unit in which the present teachings are practiced;

Figure 2 illustrates the unit of Figure 1 in partial assembly having portions broken away and having one member raised to afford access for final decontamination;

Figure 3 is a pictorial cut-away view of the fully assembled rectifier unit, with attached electrical conductor and heat-dissipating elements;

Figure 4:
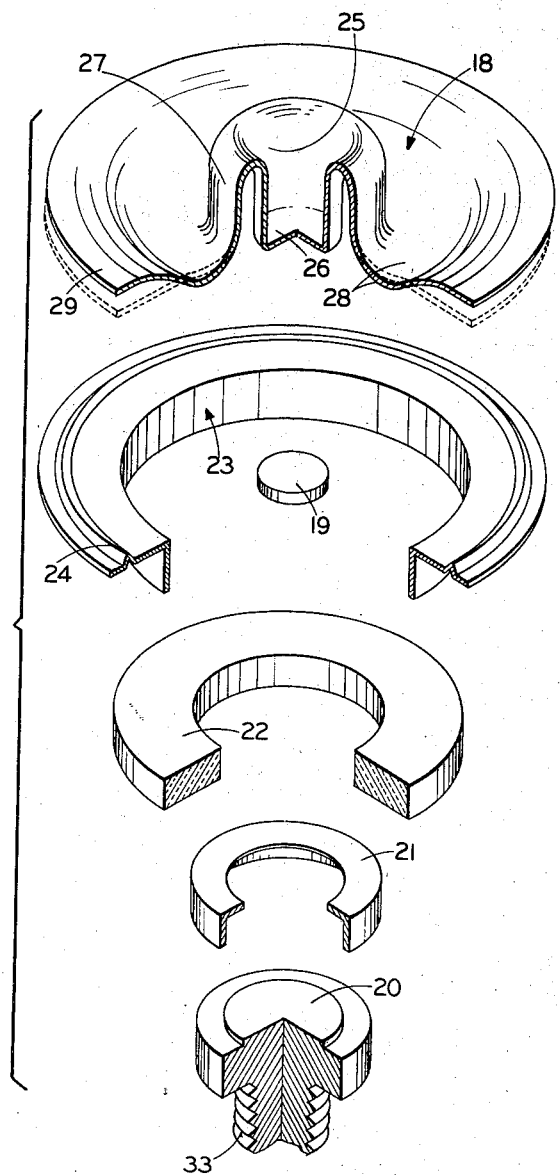
Figure 5:
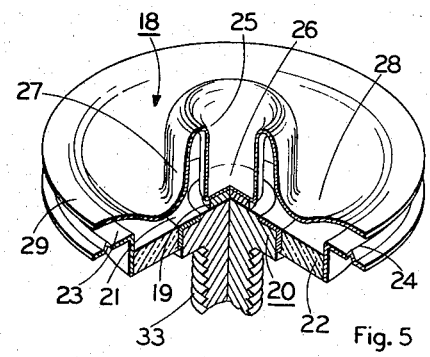
Figure 6:
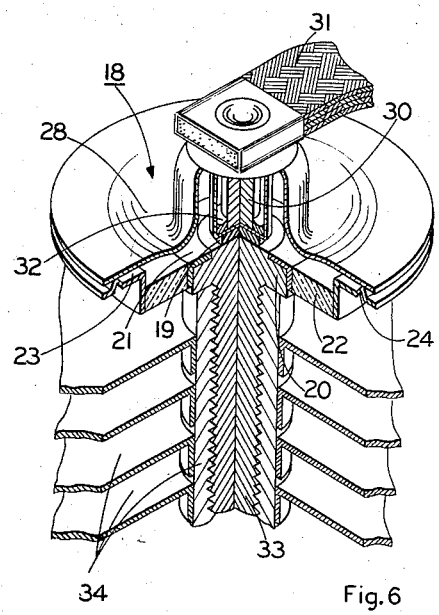

Figure 4 presents an exploded pictorial view of an alternative embodiment of our invention;

Figure 5 illustrates a partially-assembled cut-away unit including the components shown in Figure 4; and Figure 6 shows a fully-sealed cut-away rectifier unit corresponding to that of Figures 4 and 5, with an attached electrical bus.

The embodying apparatus portrayed in Figures 1 through 3 includes a small circular semiconductor wafer 1, which may be of germanium or silicon, for example. This unilaterally-conductive wafer is sandwiched intermediate the closed base of a central cup-shaped conductive portion 2 of a first electrode structure and a center disk-shaped conductive portion 3 of a second electrode structure, the opposite faces of the wafer being soldered to the cooperating flat surfaces of these portions of the electrode structures. Any suitable conductive metal may be employed in the construction of these parts, and it is noted that an alloy of nickel and iron is useful. The closed bottom surface 4 of cup-shaped member 2 is formed as flat as is reasonably possible, such that it will evenly abut the top face of wafer 1, and the cylindrical side wall structure 5 of this member is everywhere normal to the base and is of the smallest diameter commensurate with an adequate base area to convey needed currents and to accommodate a sufficiently large external circuit bus. The solders (not visible) employed to join the wafer and electrodes may have improtant characteristics. For example, where wafer 1 comprises germanium having N-type characteristics, an indium solder which bonds cup 2 with the top surface of wafer 1 may become alloyed with the germanium to form a P-N rectifying junction. The opposite wafer face is bonded to the top surface of disk 3 by a solder, such as an arsenic-tin solder, which does not impart P-type characteristics to the germanium.

Cup-shaped member 2 is preferably joined with the annular ceramic insulator 6 and a flexible closure member 7 in an electrode structure subassembly relationship prior to the aforesaid soldering and alloying of cup 2 with the germanium wafer. Annular insulator 6 may be of fused alumina, for example, which is impervious to gases and other contaminants, and possesses a radial width necessary to insure adequate protection against leakage and arc discharges at the cell voltages to be experienced. The closure member 7 is of critical configuration, being generally annular in outline and having an inner cylindrical body portion 8 from the bottom of which extends undulating or corrugated surfaces 9 terminating in a substantially planar rim 10 having a circular ridge or projection 11 protruding from the under side thereof. Member 7 is formed of a metal which may be stressed to provide spring-like characteristics, one suitable metal comprising a deep drawing steel. Desired stresses for the spring snap-action characteristics are produced by cold-working of the metal, with such annealing as may be necessary to relieve undue localized forces, and the condition is realized wherein the rim or peripheral portion 10 tends to remain fixed in one of two lateral positions. At either the position illustrated in solid or dashed lines in Figure 1, this rim portion, 10, is located such that the corrugations 9 have a minimum compression, whereas at intermediate unstable positions of the rim the corrugations become more compressed and the tendencies which they have to expand because of the spring-like qualities of the metal causes the rim to be forced quickly to one or the other of the stable positions shown. Because of its cylindrical shape, body portion 8 is a rigid structure and thus remains substantially fixed and unchanged when the aforementioned actions occur. This is advantageous in that the insulator 6 joined to the cylindrical body portion 8 near its upper open end is then unaffected by the snap action. The juncture of parts 7, 6, and 2 into a unified electrode structure subassembly may be performed by metallizing the inner and outer edges of insulator 6 and brazing the parts together in an oven at about 1000° C. using silver as the bonding metal. These parts have the joined subassembly relationship which should be apparent from an inspection of Figures 2 and 3.

For purposes of facilitating an optimum projection weld as a last step, the center disk portion 3, which may be a copper disk, is sealed and soldered with a thin annular ring 12 made of nickel-iron alloy such as that including 42% nickel an 58% iron, by weight. This subassembly forms a second electrode structure. Ring 12 is preferably thin enough to provide certain flexibility and extends radially outward beyond the periphery of the more massive disk 3. When both of these subassemblies are completed, the wafer 1 is sandwiched between them, together with the earlier-mentioned solders, and the unit is heated in a furnace at a temperature which fuses the wafer to the electrodes through the solder yet does not destroy the subassembly seals and junctions. A temperature of about 500° to 650° C. may be satisfactory, and a hydrogen atmosphere may be desirable.

Following the fusing of the subassemblies with the wafer, the unit has the appearance displayed in Figure 2. It will be noted that the rim 10 of closure member 7 is in the raised position, and that the lower edges of the cylindrical body portion 8 and corrugations 9 of this closure member are disposed above and do not contact either the wafer 1 or base electrode structure. The last-mentioned relationship obtains because the cup-shaped member 2 is of greater axial length or depth than the cylindrical body portion 8. It thus occurs that the edges of wafer 1 are fully accessible from the exterior of the unit, a condition which is promoted by the flush relationship of the top surfaces of ring 12 and the base portion 3 into which the ring is recessed. The exposed cell edges may then be cleaned to eliminate surface contamination and leakage and short-circuiting across the P-N junction region of the cell. The cleaning may be by a chemical or electrochemical etching. For example, the cell unit may be placed in a sodium or potassium hydroxide solution and connected as one electrode in an electrolytic cell circuit. Following the initial cleaning operations, the cell is washed and dried and the rim 10 of closure member 7 is snapped downwardly to its lowermost position wherein its projection or ridge 11 rests upon the ring 12. The cell is then enclosed and somewhat protected against contaminants, though not hermetically sealed. Thereafter, the cell unit may be fully sealed in a single rapid projection welding step performed near its periphery where the high temperatures experienced remain isolated from the wafer and may be dissipated without adversely affecting the wafer and other seals. High currents needed for this welding are applied by copper electrodes in a known way, one of the electrodes having a sharp circular edge adapted to fit within the top depression of ridge 11. The applied high current is localized at the knife-edge mating surfaces of ridge 11 and ring 12 with the result that heating occurs principally at the knife-edge positions and achieves a sound and fully sealed weld with exceptional rapidity. Welding takes place so quickly that the surrounding areas do not have an opportunity to become excessively heated.

In Figure 3 the completed cell unit is shown associated with a cooling assembly and current bus. As there shown, the cup-shaped member 2 accommodates a cylindrical conducting terminal 13 which is bonded thereto with a solder 14 and which is staked with a flexible braided bus 15. The base portion 3 is in turn soldered or otherwise affixed in a good thermal- and electrical-conducting relationship to a rod or lug 16 carrying heat-dissipating fins 17.

The embodiment of these teachings portrayed in Figures 4 through 6 is one wherein one cell contact or electrode structure having snap-action closure characteristics is of an integral single-piece construction rather than a subassembly of multiple joined parts. In their exploded relationship in Figure 4, the cell unit components displayed are the single-piece closure and electrode structure 18, semiconductor wafer 19, a copper base member 20, a nickle-iron alloy ring 21 for mounting about the electrode 20, an annular ceramic insulator 22, and an annular sealing member 23 having an upwardly-extending knife-edge projection 24. Closure and contact member 18 may be stamped or otherwise cold-worked into the illustrated configuration from material, such as deep drawing steel, which will exhibit certain desired spring-like characteristics. This member includes an inner cup-shaped portion with structurally rigid cylindrical side walls 25 closed at the bottom by an integral planar wall 26 and merging at the top with an integral outer concentric cylindrical portion 27. The outer cylindrical portion in turn merges with an undulant or corrugated section 28 which terminates in a substantially planar rim 29. As in the case of the closure member in Figure 1, the member 18 possesses a snap-action flexure characteristic, occasioned by its construction, which tends to urge the rim 29 into either of the positions shown in solid and dashed lines. An important aspect of this structure is found in the relatively small diameter required, an advantage derived from absence of an insulator as part of the top electrode structure. The needed insulation between electrodes is instead provided by the ceramic ring 22 which is part of the lower electrode structure subassembly. It should be recognized that the undulant region 28 of closure member 18 must have a certain radial width sufficient to permit the flexures needed as rim 29 is moved between its upper and lower positions, and that the intervention of an insulator between the cup-shaped center portion and the undulant region would necessitate a greater overall diameter of the closure member and, thus, the entire cell unit. The lower electrode subassembly need not be of greater diameter than that of the closure member, despite the inclusion of annular insulator 22 there, because the base member 20 is designed for cooling by fins, pins, etc., and may be made to have a relatively small diameter.

In fabricating the lower electrode subassembly, the ceramic insulating ring 22 is metallized and brazed with the inner and outer annular nickel-iron alloy members 21 and 23, respectively, in an oven, using silver as a bonding metal between the cylindrical portions of these members and the cylindrical peripheries of insulating ring 22. Inner annular member 21 is soldered about the copper base member 20, and the resulting subassembly then possesses an entirely planar upper surface except for the circular ridge 24. Thereafter, the semiconductor wafer 19 and solder for its faces are sandwiched between base member 20 and the bottom of planar wall 26 of closure member 18, and the desired alloying and soldering are brought about in an oven at temperatures non-injurious to the subassembly seals. With rim 29 in the raised position appearing in Figure 5, wafer 19 is exposed for etching and drying, and the rim is then lowered to rest upon circular ridge 24 of the lower subassembly. This closure protects the semiconductor against certain contaminants until a peripheral projection weld is made to complete the hermetic sealing of the unit. Welding is achieved in a manner detailed earlier herein, except that the welding electrodes are now reversed to accommodate the ridge on the lower electrode structure. Cylindrical terminal 30 provides electrical coupling between its affixed braided bus 31 and the top face of wafer 19 through the accommodating cup-shaped portion of closure member 18 and solder 32 affords a bond between the member 18 and terminal 30. Base member 20 is shown to possess the integral threaded extension 33 which mates with an internally-threaded electrical bus and heat-dissipating structure 34, although it will be appreciated that other techniques may be employed for mounting and connecting this member.

It should be apparent that rectifier cell units embodying our teachings may involve solders and bonding agents other than the specific solders and welds referred to. Also, rectifier cells of other types, such as selenium or copper oxide cells may be substituted for those described. Thus, while we have disclosed certain preferred embodiments by way of illustrating our invention, those skilled in the art will appreciate that various substitutions and modifications may be made without departure from the spirit or scope of the invention as expressed in the appended claims.

What we claim as new and desire to secure by Letters Patent of the United States is:

1. Current rectifier apparatus comprising a semi-conductor member having oppositely-disposed contact surfaces; a first contact structure having a central portion conductively secured to one of said contact surfaces, an outer rim portion, and an annular corrugated portion intermediate said rim and center portions; a second contact structure having a center portion conductively secured to the other of said contact surfaces and having peripheral surfaces extending beyond the edges of said semiconductor member; said annular corrugated portion being radially compressed by said rim portion to urge said rim portion between a first position in which said rim portion is separated from said second contact structure to afford access to edges of said semiconductor member for cleaning purposes and a second position in which said rim portion rests upon said peripheral surfaces of said second contact structure; means for sealing said peripheral and rim surfaces together when said rim portion is in said second position; and insulating means in one of said contact structures disposed to prevent electrical short-circuiting of said semiconductor member by said contact structures.

2. Current rectifier apparatus comprising a semiconductor wafer having oppositely-disposed substantially planar contact surfaces, a first electrode structure having a central portion with a substantially planar surface conductively secured to one of said contact surfaces and having a substantially annular corrugated portion joined with said central portion, a second electrode structure having a substantially planar surface conductively secured to the other of said contact surfaces, said annular corrugated portion of said first electrode structure being stressed to urge the outer peripheral part of said annular portion between positions in which said outer peripheral part rests upon said second electrode structure and in which said outer peripheral part is separated from said second electrode structure to afford access to edges of said wafer, means sealing said outer peripheral part of said annular portion of said first electrode structure with said second electrode, and insulating means in one of said electrode structures disposed to prevent electrical short-circuiting of said wafer by said electrode structures.

3. Current rectifier apparatus comprising a semiconductor wafer having oppositely-disposed substantially planar contact surfaces, a first electrode structure having a central cup-shaped portion with a closed substantially planar bottom wall conductively secured to one of said contact surfaces and having a substantially annular corrugated portion, the inner part of which is fixed with said cup-shaped portion near the open end thereof, a second substantially planar electrode structure conductively secured to the other of said contact surfaces, said annular corrugated portion of said first electrode structure being stressed to urge the outer peripheral part of said annular portion between positions in which said outer peripheral part rests upon said second electrode structure and in which said outer peripheral part is separated from said second electrode structure to afford access to edges of said wafer, means sealing said outer peripheral part of said annular portion of said first electrode structure with said second electrode, and insulating means in one of said electrode structures disposed to prevent electrical short-circuiting of said wafer by said electrode structures.

4. Current rectifier apparatus comprising a semiconductor member having oppositely-disposed contact surfaces; a first contact structure having a rigid central portion conductively secured to one of said contact surfaces, an outer rim portion, and an annular corrugated portion sealed with and intermediate said center and rim portions; a second contact structure having a center portion conductively secured to the other of said contact surfaces, a hollow impervious insulator sealed with said center portion, and a peripheral portion sealed with said insulator in electrically insulated relationship to said center portion; said annular corrugated portion being radially compressed by said rim portion to urge said rim portion between a first position in which said rim portion is separated from said first contact structure to afford access to edges of said semiconductor member for cleaning and a second position in which said rim portion rests upon said peripheral portion of said contact structure; and means for sealing said peripheral and rim portions of said contact structures together to complete hermetic enclosure of said semiconductor member.

5. Current rectifier apparatus comprising a semiconductor member having oppositely-disposed contact surfaces; a first contact structure having a rigid central portion conductively secured to one of said contact surfaces, a hollow impervious insulator sealed with said central portion, an annular corrugated portion sealed with said insulator in electrically insulated relationship to said central portion, and an outer rim portion integral with said corrugated portion; a second contact structure having a center portion conductively secured to the other of said contact surfaces and having a peripheral portion extending outwardly beyond the edges of said semiconductor member; said annular corrugated portion being radially compressed by said rim portion to urge said rim portion between a first position in which said rim portion is separated from said first contact structure to afford access to edges of said semiconductor member for cleaning purposes and a second position in which said rim portion rests upon said pheripheral portion of said second contact structure; and means for sealing said pheripheral and rim portions of said contact structures together to complete hermetic enclosure of said semiconductor member.

6. Current rectifier apparatus comprising a semiconductor wafer having oppositely-disposed substantially planar contact surfaces; a first snap-action contact structure having a central cup-shaped portion with a closed substantially planar bottom wall conductively secured to one of said wafer surfaces, an annular portion the inner part of which is integral with said cup-shaped portion near the open end thereof and the outer part of which is undulant and flexible, and a substantially planar rim portion integral with said annular portion; a second contact structure having a center portion with a substantially planar surface conductively secured to the other of said wafer surfaces, an annular impervious insulator sealed with said center portion in surrounding relationship thereto, and an annular and substantially planar surfaced peripheral portion sealed with said insulator; said undulant part of said snap-action structure being compressed in radial directions by said rim portion whereby said rim portion tends to be urged by snap action between a first position in which said rim portion is separated from said second contact structure to afford access to edges of said wafer for cleaning and a second position in which said rim portion rests upon peripheral portion of said second contact structure; and means for sealing said peripheral and rim portions together to complete hermetic enclosure of said semiconductor wafer by said contact structures.

7. Current rectifier apparatus comprising a semiconductor wafer having oppositely-disposed substantially planar contact surfaces; a first snap-action contact structure having a central cup-shaped member with a closed substantially planar bottom wall conductively secured to one of said wafer surfaces, an annular impervious insulator sealed with said central cup-shaped portion near the open end thereof and in surrounding relationship thereto, an annular snap-action member the inner part of which is sealed with said insulator and the outer part of which is undulant and flexible, and a substantially planar outer rim integral with said annular member; a second contact structure having a substantially planar central surface conductively secured to the other of said wafer surfaces and having a substantially planar peripheral surface extending beyond the edges of said wafer; said annular member of said first contact structure being compressed in radial directions by said rim portion whereby said rim portion tends to be urged by snap action between a first position in which said rim is separated from said peripheral surface to afford access to edges of said wafer for cleaning and a second position in which said rim rests upon said peripheral surface of said second contact structure; and means for sealing said rim to said peripheral surface to complete hermetic enclosure of said semiconductor wafer by said contact structures.

References Cited in the file of this patent

UNITED STATES PATENTS

| | | |
|---|---|---|
| 2,665,399 | Lingel | Jan. 5, 1954 |
| 2,745,044 | Lingel | May 8, 1956 |
| 2,756,374 | Colleran et al. | July 24, 1956 |